United States Patent
Lee et al.

(10) Patent No.: US 10,667,137 B2
(45) Date of Patent: May 26, 2020

(54) METHOD AND APPARATUS FOR PROVIDING CONTENTS IN COMMUNICATION SYSTEM

(71) Applicant: Samsung Electronics Co., Ltd., Gyeonggi-do (KR)

(72) Inventors: Chul-Ki Lee, Seoul (KR); Hyeon-Jin Kang, Seoul (KR); Sang-Jun Moon, Seoul (KR); Yong-Seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 670 days.

(21) Appl. No.: 14/368,245

(22) PCT Filed: Dec. 21, 2012

(86) PCT No.: PCT/KR2012/011283
§ 371 (c)(1),
(2) Date: Jun. 23, 2014

(87) PCT Pub. No.: WO2013/095052
PCT Pub. Date: Jun. 27, 2013

(65) Prior Publication Data
US 2015/0088659 A1 Mar. 26, 2015

(30) Foreign Application Priority Data
Dec. 23, 2011 (KR) .................. 10-2011-0141422

(51) Int. Cl.
*H04W 16/04* (2009.01)
*H04M 3/487* (2006.01)
(Continued)

(52) U.S. Cl.
CPC ............ *H04W 16/04* (2013.01); *G06Q 30/02* (2013.01); *G06Q 30/0267* (2013.01);
(Continued)

(58) Field of Classification Search
CPC combination set(s) only.
See application file for complete search history.

(56) References Cited

U.S. PATENT DOCUMENTS 5,884,037 A * 3/1999 Aras ...................... H04L 47/741
709/226
6,657,958 B1 * 12/2003 Tanaka ................ H04L 12/5601
370/230.1

(Continued)

FOREIGN PATENT DOCUMENTS

| EP | 0781068 A1 | 6/1997 |
| JP | 2000-270015 | 9/2000 |

(Continued)

OTHER PUBLICATIONS

International Search Report dated Mar. 26, 2013 in connection with International Patent Application No. PCT/KR2012/011283, 3 pages.
(Continued)

*Primary Examiner* — Eric R Netzloff
*Assistant Examiner* — Dipen M Patel (57) ABSTRACT

A method of providing contents in a communication system by a proxy server includes selecting one of a first content and a second content based on a first channel bandwidth usable by a terminal and a second channel bandwidth usable by a base station; and providing the selected content to the terminal, wherein the first content requires a wider channel bandwidth than a channel bandwidth of the second content.

10 Claims, 4 Drawing Sheets

(51) Int. Cl.
*G06Q 50/10* (2012.01)
*G06Q 30/02* (2012.01)
*H04L 29/06* (2006.01)
*H04W 4/21* (2018.01)
*H04L 29/08* (2006.01)
*H04W 16/16* (2009.01)

(52) U.S. Cl.
CPC ......... *G06Q 50/10* (2013.01); *H04L 65/4084* (2013.01); *H04L 65/605* (2013.01); *H04L 65/80* (2013.01); *H04L 67/02* (2013.01); *H04M 3/4878* (2013.01); *H04W 4/21* (2018.02); *H04W 16/16* (2013.01)

(56) References Cited

U.S. PATENT DOCUMENTS

| | | | | |
|---|---|---|---|---|
| 7,793,316 | B2* | 9/2010 | Mears | G06Q 30/02 725/9 |
| 8,036,690 | B1* | 10/2011 | Delker | H04W 4/18 455/115.3 |
| 8,503,398 | B2* | 8/2013 | Yokota | H04W 36/005 370/331 |
| 9,166,881 | B1* | 10/2015 | Gray | H04L 43/0894 |
| 9,292,826 | B1* | 3/2016 | Chen | H04L 1/1877 |
| 2001/0044835 | A1* | 11/2001 | Schober | G06F 8/60 709/217 |
| 2002/0160748 | A1* | 10/2002 | Rahman | H04M 15/745 455/406 |
| 2009/0282127 | A1* | 11/2009 | Leblanc | H04L 12/5695 709/219 |
| 2010/0235438 | A1 | 9/2010 | Narayanan et al. | |
| 2012/0192080 | A1* | 7/2012 | Lloyd | G06F 17/30905 715/744 |

FOREIGN PATENT DOCUMENTS

| | | | | |
|---|---|---|---|---|
| JP | 2004-348494 | | 12/2004 | |
| JP | 2011176601 | A | 9/2011 | |
| KR | 10-2008-0006373 | A | 1/2008 | |
| KR | 10-2009-0123044 | | 12/2009 | |
| KR | 20100062828 | A * | 6/2010 | ............. G06F 15/16 |

OTHER PUBLICATIONS

Written Opinion of International Searching Authority dated Mar. 26, 2013 in connection with International Patent Application No. PCT/KR2012/011283, 5 pages.

Hwang, Minjung et al., "Expression of motion shown in the types of mobile advertisement", Digital Design Studies, vol. 11, Issue 4, Oct. 30, 2011, 11 pages.

Office Action dated Apr. 19, 2019 in connection with Korean Patent Application No. 10-2012-0151016, 9 pages.

Korea Intellectual Property Office, "Decision of Grant," Application No. KR 10-2012-0151016, dated Oct. 10, 2019, 7 pages.

* cited by examiner

METHOD AND APPARATUS FOR PROVIDING CONTENTS IN COMMUNICATION SYSTEM

CROSS-REFERENCE TO RELATED APPLICATION S

The present application claims priority under 35 U.S.C. § 365 to International Patent Application No. PCT/KR2012/011283 filed Dec. 21, 2012, entitled "METHOD AND APPARATUS FOR PROVIDING CONTENTS IN COMMUNICATION SYSTEM". International Patent Application No. PCT/KR2012/011283 claims priority under 35 U.S.C. § 365 and/or 35 U.S.C. § 119(a) to Korean Patent Application No. 10-2011-0141422 filed Dec. 23, 2011 and which are incorporated herein by reference into the present disclosure as if fully set forth herein.

TECHNICAL FIELD

The present invention relates generally to a method and an apparatus for providing contents in a communication system.

BACKGROUND ART

As terminals have come into wide use, products or services are promoted for users of the terminals, or a mobile advertisement is increasingly used as part of marketing methods. Further, the mobile advertisement has come into the spotlight from service providers as a benefit creation model.

One difference between the mobile advertisement and a wired advertisement is the providing of an advertisement when an application is executed in the terminal. However, when the user executes the application through the terminal, the advertisement is provided before the application is executed. Here, the advertisement is provided in a form of an image content or a video content, and such an advertisement type is called a pre-roll advertisement. Hereinafter, the image content and the video content are commonly defined as an advertisement content.

DISCLOSURE OF INVENTION

Technical Problem

When providing the advertisement content to the terminal, a content server determines an available bandwidth and adjusts a bit rate of the advertisement content to provide the advertisement content. However, since the pre-roll advertisement should be quickly downloaded before the user executes the application, it is inefficient to use a method of adjusting the bit rate of the advertisement content.

Solution to Problem

The present invention provides a method and an apparatus for providing contents to a terminal in a communication system. Also, the present invention provides a method and an apparatus for providing one selected from a first content and a second content requiring a channel bandwidth wider than that of the first content to a terminal based on one of available channel bandwidths of the terminal and available channel bandwidths of a base station.

In accordance with an aspect of the present invention, a method of providing contents in a communication system by a proxy server is provided. The method includes selecting one of a first content and a second content based on a first channel bandwidth usable by a terminal and a second channel bandwidth usable by a base station; and providing the selected content to the terminal, wherein the first content requires a wider channel bandwidth than a channel bandwidth of the second content.

In accordance with another aspect of the present invention, a method of providing contents in a communication system by a proxy server is provided. The method includes determining a providing ratio of each of a first content and a second content; if a content request is received, generating a random value according to the determined providing ratio and comparing the generated random value with a threshold; and providing one of the first content and the second content to a terminal based on a result of the comparison, wherein the first content requires a wider channel bandwidth than a channel bandwidth of the second content.

In accordance with another aspect of the present invention, a proxy server in a communication system is provided. The proxy server includes a controller for selecting one of a first content and a second content based on one of a first channel bandwidth usable by a terminal and a second channel bandwidth usable by a base station; and a transmitter for providing the selected content to the terminal, wherein the first content requires a wider channel bandwidth than a channel bandwidth of the second content.

In accordance with another aspect of the present invention, a proxy server in a communication system is provided. The proxy server includes a controller for determining a providing ratio of each of a first content and a second content, if a content request is received, generating a random value according to the determined providing ratio, and comparing the generated random value with a threshold; and a transmitter for transmitting one of the first content and the second content to a terminal base on a result of the comparison, wherein the first content requires a wider channel bandwidth than a channel bandwidth of the second content.

Advantageous Effects of Invention

A proxy server according to the present invention can provide a content suitable for a channel state of the terminal and the base station every time. Accordingly, the present invention has an advantage in that the user can receive the corresponding content without any inconvenience.

Meanwhile, another effect according to the present invention will be explicitly or implicitly disclosed in the detailed description according to embodiments of the present invention described below.

BEST MODE FOR CARRYING OUT THE INVENTION

Hereinafter, exemplary embodiments of the present invention will be described with reference to the accompanying drawings. In the following description, only parts required to understand operations according to the present invention will be discussed, and the other parts will be omitted when it may make the subject matter of the present invention rather unclear.

The present invention provides a method and an apparatus for selecting one of a first content and a second content having a bandwidth narrower than that of the first content by considering one of an available channel bandwidth by each terminal and an available channel bandwidth by a base station in a proxy server and providing the selected content to each terminal.

Hereinafter, to assist the understanding of the present invention, a case where both the first content and the second content are advertisement contents, the first content is a video content, and the second content is an image content will be described as an example. However, the first content and the second content are not limited to the video content and the image content, and may be other contents having different bandwidths from each other.

Figure 1:
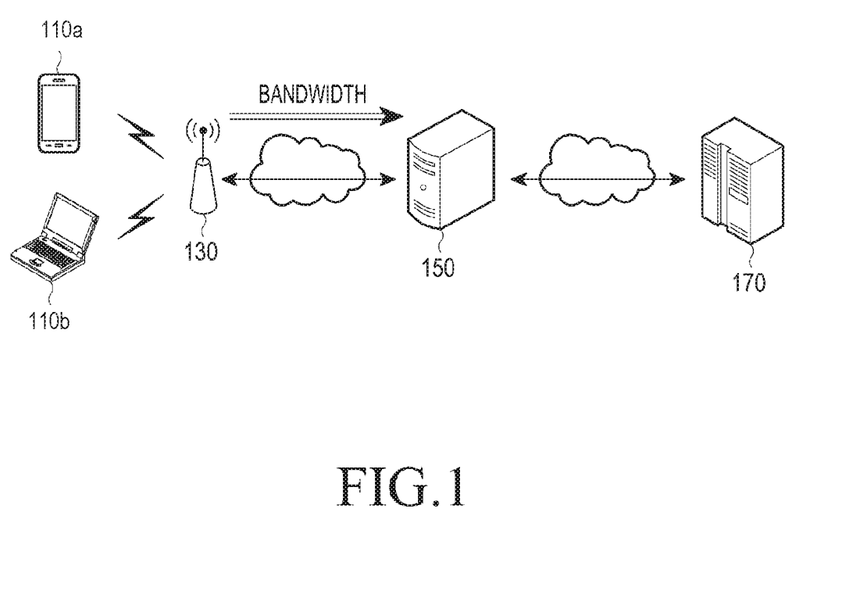
FIG. 1 illustrates a communication system for providing an advertisement content according to an embodiment of the present invention.

FIG. 1 illustrates a communication system for providing an advertisement content according to an embodiment of the present invention.

Referring to FIG. 1, the communication system includes a terminal 110a or 110b, a base station 130, a proxy server 150, and a content server 170.

The proxy server 150 receives in advance advertisement contents containing an image content and a video content from the content server 170 and then stores the received advertisement contents. Further, the proxy server 150 receives at least one of channel bandwidth information of the terminal 110a or 110b and channel bandwidth information of the base station 130 from the base station 130. The channel bandwidth information of the terminal 110a or 110b contains information on a channel bandwidth usable by the terminal 110a or 110b, and the channel bandwidth information of the base station 130 contains information on a channel bandwidth usable by the base station 130. Hereinafter, for convenience of the description, the channel bandwidth useable by the terminal 110a or 110b is referred to as a channel bandwidth of the terminal 110a or 110b, and the channel bandwidth usable by the base station 130 is referred to as a channel bandwidth of the base station 130.

The proxy server 150 may periodically receive the channel bandwidth information of the terminal 110a or 110b and the channel bandwidth information of the base station 130, or may receive the channel bandwidth information of the terminal 110a or 110b and the channel bandwidth information of the base station 130 after transmitting a message for making a request for providing the channel bandwidth information of the terminal 110a or 110b and the channel bandwidth information of the base station 130 by the base station 130. Further, when there are a plurality of terminals communicating with the base station 130, the proxy server 150 may receive channel bandwidth information of each of the plurality of terminals from the base station 130.

The proxy server 150 selects one content to be provided to the terminal 110a or 110b from contents to be transmitted to channel bandwidths having different sizes based on at least one of the received information. For example, the proxy server 150 selects one content from an image content and a video content requiring a channel bandwidth wider than that of the image content. Further, the proxy server 150 provides the selected content to the terminal 110a or 110b directly or via the base station 130.

Meanwhile, the channel bandwidth of the terminal 110a or 110b and the channel bandwidth of the base station 130 may be continuously changed according to a time. Further, the channel bandwidth of the base station 130 may be not sufficient to provide the video content. Accordingly, the base station 130 may check the channel bandwidth of the terminal 110a or 110b and the channel bandwidth of the base station 130 in real time or periodically and transmit information on the checked channel bandwidth of the terminal 110a or 110b and the checked channel bandwidth of the base station 130 to the proxy server 150.

Hereinafter, a content providing method proposed in an embodiment of the present invention will be described in detail. As described above, in embodiments of the present invention described below, the case where a content to be provided to the terminal 110a or 110b is the advertisement content will be described as an example.

Figure 2:
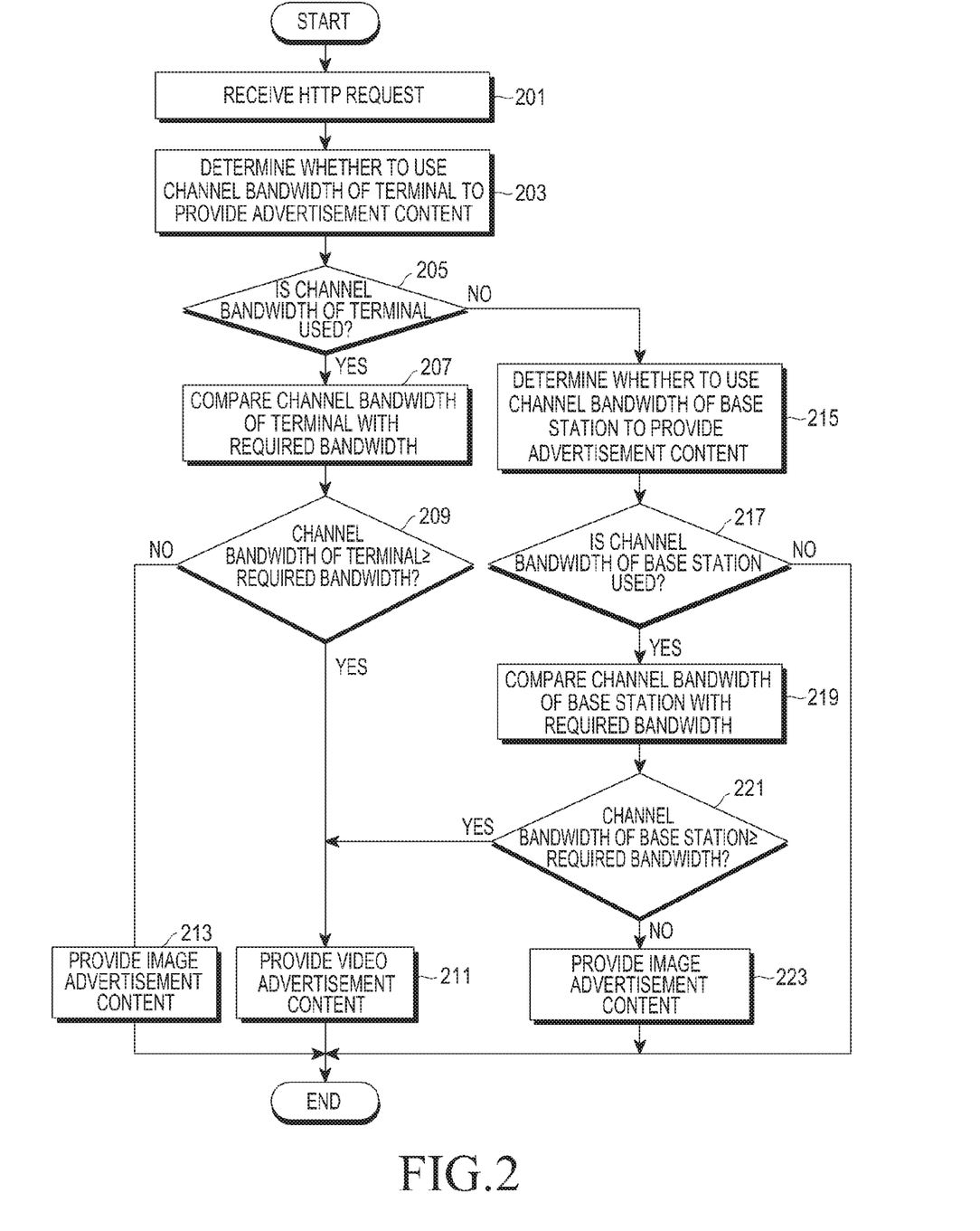
FIG. 2 is a flowchart illustrating a method of providing an advertisement content in a proxy server according to an embodiment of the present invention.

FIG. 2 is a flowchart illustrating a method of providing the advertisement content in a proxy server according to an embodiment of the present invention.

Referring to FIG. 2, in step 201, the proxy server 150 receives a Hypertext Transfer Protocol (HTTP) request from the terminal 110a or 110b. The HTTP request may be an advertisement content request according to an execution of an application in the terminal 110a or 110b.

Subsequently, in step 203, proxy server 150 determines whether to use the channel bandwidth of the terminal 110a or 110b in order to provide the advertisement content. That is, the proxy server 150 determines whether to provide the advertisement content based on the channel bandwidth of the terminal 110a or 110b.

When the proxy server 150 determines to use the channel bandwidth of the terminal 110a or 110b in step 205, the proxy server 150 proceeds to step 207 and compares the channel bandwidth of the terminal 110a or 110b with a required bandwidth. The required bandwidth refers to a channel bandwidth required for transmitting a video advertisement content to the terminal 110a or 110b, and may be determined using, for example, equation (1) below.

MathFigure 1

$$\text{Required bandwidth} = \text{video\_bit\_rate} + \text{margin\_bit\_rate} \quad \text{[Math.1]}$$

In equation (1) above, video bit rate denotes a bit rate of a video recorded in the video advertisement content, and margin bit rate denotes a bit rate considering a channel deviation value, that is, a variable channel state.

When the channel bandwidth of the terminal 110a or 110b is larger than or equal to the required bandwidth in step 209, the proxy server 150 proceeds to step 211 and provides the video advertisement content to the terminal 110a or 110b. On the other hand, when the channel bandwidth of the terminal 110a or 110b is smaller than the required bandwidth, the proxy server 150 proceeds to step 213 and provides an image advertisement content to the terminal 110a or 110b.

Meanwhile, when the proxy server 150 determines not to use the channel bandwidth of the terminal 110a or 110b in step 205, the proxy server 150 proceeds to step 215 and determines whether to use the channel bandwidth of the base station 130 in order to provide the advertisement content.

When the proxy server 150 determines not to use the channel bandwidth of the base station 130 in step 217, the proxy server 150 ends all processes. Further, when the proxy server 150 determines to use the channel bandwidth of the base station 130, the proxy server 150 proceeds to step 219 and compares the channel bandwidth of the base station 130 with the required bandwidth.

When the channel bandwidth of the base station 130 is larger than or equal to the required bandwidth in step 221, the proxy server 150 proceeds to step 211 and provides the video advertisement content to the terminal 110a or 110b. On the other hand, when the channel bandwidth of the base station 130 is smaller than the required bandwidth, the proxy server 150 proceeds to step 223 and provides the image advertisement content to the terminal 110a or 110b. Meanwhile, the channel bandwidth of the base station 130 may be contained in channel bandwidth information of the base station 130 received from the base station 130. However, the channel bandwidth of the base station 130 may be determined using a value used for determining the channel bandwidth of the base station 130. In this case, the value used for determining the channel bandwidth of the base station 130 is contained in the channel bandwidth information of the base station 130, and the proxy server 150 determines the channel bandwidth of the base station 130 by using one of the following three methods.

Among the three methods, the first method determines the channel bandwidth of the base station 130 based on a radio resource block. When the communication system is an LTE communication system, OFDM symbols are divided based on a frequency and managed as the radio resource block. Accordingly, when there is a radio resource block which has not been used, it can be known that there are resources available in a wireless network.

Therefore, the proxy server 150 determines a ratio of the number of unused radio resource blocks to the number of total radio resource blocks. The proxy server 150 determines a channel bandwidth corresponding to the determined ratio by using table 1 below. Meanwhile, the number of total radio resource blocks and the number of unused radio resource blocks may be contained in the channel bandwidth information of the base station 130.

Table 1

TABLE 1

| the number of unused radio resource blocks/the number of total radio resource blocks | channel bandwidth information of the base station |
| --- | --- |
| 0.2 | 20 Mbps |
| 0.5 | 50 Mbps |
| ... | ... |
| 1 | 100 Mbps |

For example, when the number of total radio resource blocks is 50 and the number of unused radio resource block is 10, "the number of unused radio resource blocks/the number of total radio resource blocks" becomes 0.2, so that the channel bandwidth of the base station 130 may be determined as 20 Mbps corresponding to 0.2 from table 1. Among the three methods, the second method determines the channel bandwidth of the base station 130 based on the number of scheduled terminals. The proxy server 150 may estimate loads of the wireless network based on the number of scheduled terminals in the base station 130.

To this end, the proxy server 150 receives information on the maximum number of schedulable terminals in the base station 130 and the number of scheduled terminals per slot from the base station 130. The information on the maximum number of schedulable terminals and the number of scheduled terminals per slot may be contained in the channel bandwidth information of the base station 130. The proxy server 150 computes a difference between the information on the maximum number of schedulable terminals and the information on the number of scheduled terminals per slot. Further, the proxy server 150 determines the channel bandwidth of the base station 130 by using the computed difference value. For example, the proxy server 150 determines the channel bandwidth of the base station 130 by using table 2 below.

Table 2

TABLE 2

| the maximum number of schedulable terminals − the number of scheduled terminals per slot ($\chi$) | channel bandwidth of the base station |
| --- | --- |
| 0 ≤ $\chi$ < 10 | 10 Mbps |
| 10 ≤ $\chi$ < 20 | 20 Mbps |
| ... | ... |
| 100 ≤ $\chi$ | 100 Mbps |

For example, when the maximum number of schedulable terminals is 100 and the number of scheduled terminals per slot is 92, X becomes 8, so that the channel bandwidth of the base station 130 may be determined as 10 Mbps corresponding to "0≤X<10".

Among the three methods, the third method determines the channel bandwidth of the base station 130 based on an actual channel bandwidth used by the base station 130. In this case, the proxy server 150 may determine the channel bandwidth of the base station 130 by using equation (2) below.

MathFigure 2

$$\text{Channel bandwidth of base station} = \text{peak bandwidth} - \text{current bandwidth} \qquad [\text{Math.2}]$$

In equation (2), the peak bandwidth denotes a maximum channel bandwidth usable by the base station 130, and the current bandwidth denotes the channel bandwidth actually used by the base station 130. Information on the peak bandwidth and the current bandwidth may be inserted into the channel bandwidth information of the base station 130 and then transferred to the proxy server 150. In FIG. 2, the method of providing one of the video advertisement content and the image advertisement content to the terminal 110a or 110b based on one of the channel bandwidth of the terminal 110a or 110b and the channel bandwidth of the base station 130 has been described. Additionally, in embodiments of the present invention, it is possible to provide one of the video advertisement content and the image advertisement content to the terminal 110a or 110b by using a predetermined content providing ratio. The above description will be discussed in detail with reference to FIG. 3.

Figure 3:
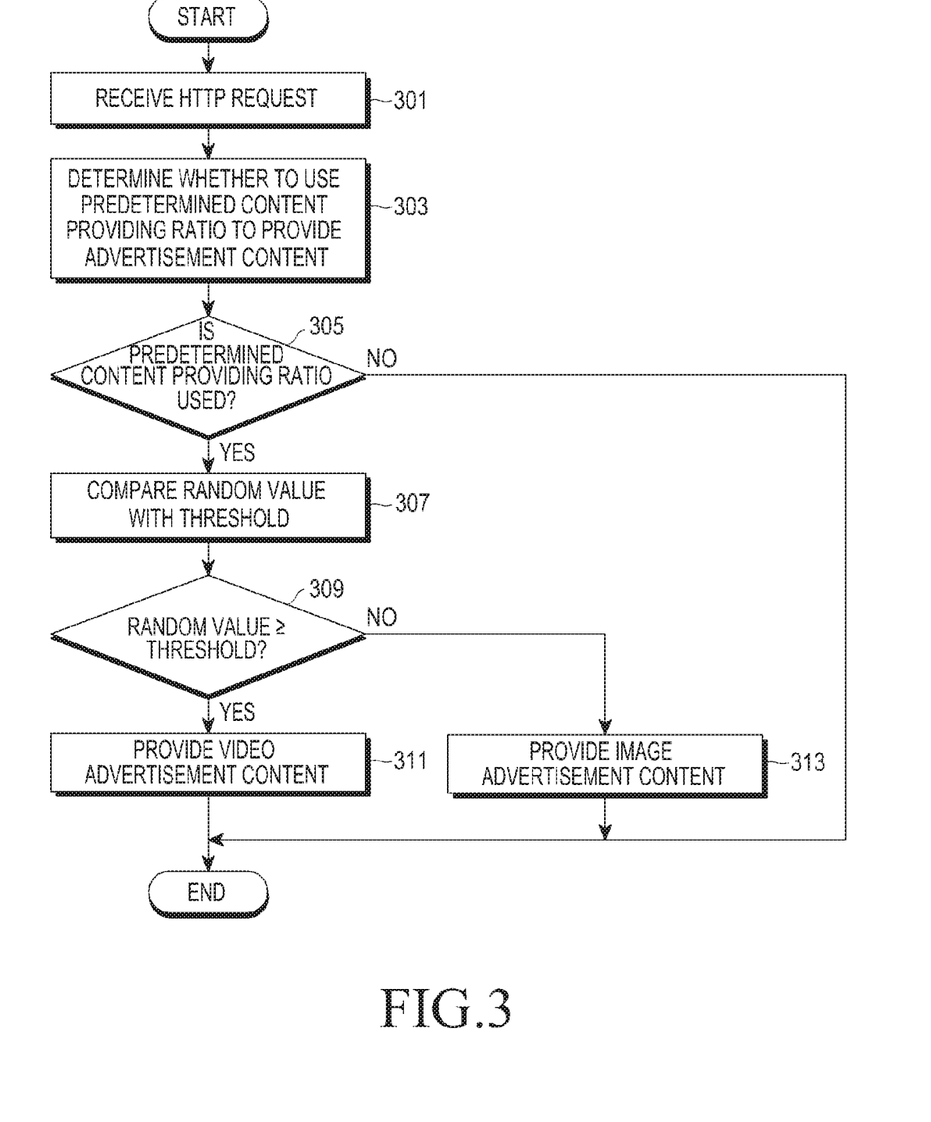
FIG. 3 is a flowchart illustrating another method of providing the advertisement content in the proxy server according to an embodiment of the present invention.

FIG. 3 is a flowchart illustrating another method of providing the advertisement content in the proxy server according to an embodiment of the present invention.

Referring to FIG. 3, the proxy server 150 receives an HTTP request from the terminal 110a or 110b in step 301. The HTTP request may be, for example, an advertisement content request according to an execution of an application in the terminal 110.

Subsequently, in step 303, the proxy server 150 determines whether to use a predetermined content providing ratio in order to provide the advertisement content. Specifically, the proxy server 150 predetermines a ratio between the image advertisement content and the video advertisement content to be provided to the terminal 110a or 110b and determines whether to provide the image advertisement content and the video advertisement content to the terminal 110a or 110b according to the predetermined ratio.

When the proxy server 150 determines to use the predetermined content providing ratio in step 305, the proxy server compares a random value with a threshold in step 307. For example, when it is predetermined to provide 70 image advertisement contents and 30 video advertisement contents among a total of 100 advertisement contents, the random value according to the determined value may be generated whenever the advertisements are provided to the terminal 110a or 110b.

Further, the proxy server 150 may determine the threshold compared with the random value by using equation (3) below.

MathFigure 3

$$\text{Threshold} = \text{channel bandwidths of base station/required bandwidths} \quad [\text{Math.3}]$$

When the random value is larger than or equal to the threshold in step 309, the proxy server 150 proceeds to step 311 and provides the video advertisement content to the terminal 110a or 110b. Further, when the random value is smaller than the threshold, the proxy server 150 proceeds to step 313 and provides the image advertisement content to the terminal 110a or 110b.

Meanwhile, a process illustrated in FIG. 3 may be used alone, or may be performed in addition to the process illustrated in FIG. 2. Specifically, when the proxy server 150 uses neither the channel bandwidth of the terminal 110a or 110b nor the channel bandwidth of the base station 130 for providing the advertisement content in FIG. 2, the proxy server 150 may perform process of FIG. 3. Further, when the proxy server 150 does not use the channel bandwidth of the terminal 110a or 110b for providing the advertisement content in FIG. 2, the proxy server 150 may perform the process of FIG. 3 instead of performing step 215. In addition, when the channel bandwidth of the terminal 110 is smaller than the required bandwidth in step 209, the proxy server 150 may perform the process of FIG. 3 instead of performing step 213.

Next, an internal configuration of the proxy server 150 will be described with reference to FIG. 4.

Figure 4:
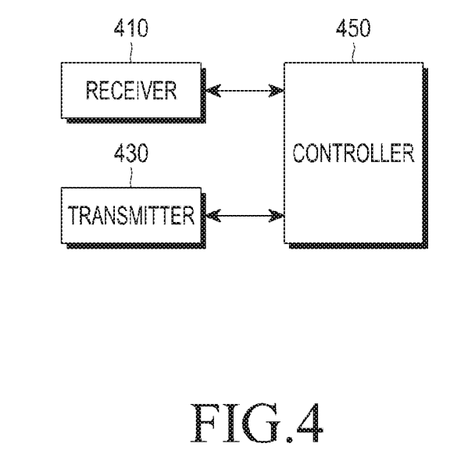
FIG. 4 is a block diagram of a proxy server for providing an advertisement content according to an embodiment of the present invention.

FIG. 4 is a block diagram of the proxy server for providing the advertisement content according to an embodiment of the present invention.

Referring to FIG. 4, the proxy server 150 includes a receiver 410, a transmitter 430, and a controller 450. FIG. 4 illustrates a case where the receiver 410 and the transmitter 330 are implemented as physical components, respectively, but the receiver 410 and the transmitter 430 may be implemented as one component as well.

The receiver 430 receives an HTTP request from the terminal 110a or 110b and transfers the received HTTP request to the controller 450. The HTTP request may be, for example, an advertisement content providing request.

When the controller 450 receives the HTTP request, the controller 450 selects one of the image content and the video content by considering one of the channel bandwidth of the terminal 110 and the channel bandwidth of the base station 130. Further, the controller 450 transfers the selected content to the transmitter 430.

Specifically, the controller 450 determines whether to use the channel bandwidth of the terminal 110a or 110b in order to provide the advertisement content. When the controller 350 determines to use the channel bandwidth of the terminal 110, the controller 450 compares the channel bandwidth of the terminal 110a or 110b with a required bandwidth. Further, when the channel bandwidth of the terminal 110a or 110b is larger than or equal to the required bandwidth, the controller 450 provides the video advertisement content to the terminal 110a or 110b. On the other hand, when the channel bandwidth of the terminal 110a or 110b is smaller than the required bandwidth, the controller 350 provides the image advertisement content to the terminal 110a or 110b.

Meanwhile, when the controller 450 determines not to use the channel bandwidth of the terminal 110a or 110b, the controller 350 determines whether to use the channel bandwidth of the base station 130 in order to provide the advertisement content. When the controller 450 determines to use the channel bandwidth of the base station 130, the controller 450 compares the channel bandwidth of the base station 130 with the required bandwidth. Further, when the bandwidth of the base station 130 is larger than or equal to the required bandwidth, the controller 450 provides the video advertisement content to the terminal 110a or 110b. On the other hand, when the channel bandwidth of the base station 130 is smaller than the required bandwidth, the controller 450 provides the image advertisement content to the terminal 110a or 110b.

Meanwhile, the controller 450 may consider using a predetermined content providing ratio instead of considering one of the channel bandwidth of the terminal 110a or 110b and the bandwidth of the base station 130 in order to provide the advertisement content. When the controller 450 determines to use the predetermined content providing ratio, the controller 450 compares a random value with a threshold. The random value may be generated whenever the advertisement content is provided to the terminal 110a or 110b according to the predetermined content providing ratio.

Further, when the random value is larger than or equal to the threshold, the controller 450 provides the video advertisement content to the terminal 110a or 110b. In addition, when the random value is smaller than the threshold, the controller 450 provides the image advertisement content to the terminal 110a or 110b.

While the present invention has been shown and described with reference to certain embodiments thereof, it will be understood by those skilled in the art that various changes in form and details may be made therein without departing from the spirit and scope of the present invention as defined by the appended claims. Therefore, the scope of the present invention should not be limited to these exemplary embodiments but should be defined by the appended claims and the equivalents thereof.

The intentioned claimed is:

1. A method for providing advertisements to a user terminal by a proxy server in a communication system in which the user terminal is connect to the proxy server via a base station, the method comprising:
   storing a plurality of different video type advertisements and a plurality of different image type advertisements;
   receiving, by a receiver of the proxy server, from the user terminal, a request for advertisement content;
   determining, by a controller of the proxy server, whether to use a providing ratio between the plurality of different video type advertisements and the plurality of different image type advertisements; and
   in response to determining to use the providing ratio:
      generating a random value according to the providing ratio;
      determining, by the controller of the proxy server, a threshold compared with the random value based on an available channel bandwidth related to available radio resources of the base station and a reference channel bandwidth, the available channel bandwidth being determined based on channel bandwidth information received from the base station;

in response to the random value being larger than or equal to the threshold, transmitting, by a transmitter of the proxy server, one of the plurality of different video type advertisements to the user terminal via the base station; and in response to the random value being smaller than the threshold, transmitting by the transmitter of the proxy server, one of the plurality of different image type advertisements to the user terminal via the base station.

2. The method of claim 1, wherein the plurality of different video type advertisements correspond to video content, and the plurality of different image type advertisements correspond to image content.

3. The method of claim 1, wherein the channel bandwidth information comprises a total number of radio resources blocks and a number of unused radio resource blocks of the base station, and wherein the available channel bandwidth is determined based on a ratio between the total number of radio resources blocks and the number of unused radio resource blocks of the base station.

4. The method of claim 1, further comprising:

determining the reference channel bandwidth based on a bit rate required for transmitting a video type advertisement and a margin bit rate, wherein the margin bit rate is determined based on information on a channel state received from the base station.

5. The method of claim 1, wherein the available channel bandwidth is determined based on one of a ratio of a number of unused radio resource blocks to a total number of radio resource blocks of the base station, a difference between a maximum number of schedulable terminals and a number of terminals scheduled in the base station, and a difference between a maximum channel bandwidth usable by the base station and a channel bandwidth used by the base station.

6. A proxy server for providing advertisements to a user terminal in a communication system in which the user terminal is connect to the proxy server via a base station, the proxy server comprising:

a memory configured to store a plurality of different video type advertisements and a plurality of different image type advertisements;

a transceiver configured to receive, from the user terminal, a request for advertisement content; and a controller coupled with the memory and the transceiver, the controller configured to:

determine whether to use a providing ratio between the plurality of different video type advertisements and the plurality of different image type advertisements; and in response to determining to use the providing ratio:

generate a random value according to the providing ratio;

determine a threshold compared with the random value based on an available channel bandwidth related to available radio resources of the base station and a reference channel bandwidth, the available channel bandwidth being determined based on channel bandwidth information received from the base station;

in response to the random value being larger than or equal to the threshold, control the transceiver to transmit one of the plurality of different video type advertisements to the user terminal via the base station; and in response to the random value being smaller than the threshold, control the transceiver to transmit one of the plurality of different image type advertisements to the user terminal via the base station.

7. The proxy server of claim 6, wherein the plurality of different video type advertisements correspond to video content, and the plurality of different image type advertisements correspond to image content.

8. The proxy server of claim 6, wherein the channel bandwidth information comprises a total number of radio resources blocks and a number of unused radio resource blocks of the base station, and wherein the available channel bandwidth is determined based on a ratio between the total number of radio resources blocks and the number of unused radio resource blocks of the base station.

9. The proxy server of claim 6, wherein the controller is further configured to:

determine the reference channel bandwidth based on a bit rate required for transmitting a video type advertisement and a margin bit rate, wherein the margin bit rate is determined based on information on a channel state received from the base station.

10. The proxy server of claim 6, wherein the available channel bandwidth is determined based on one of a ratio of a number of unused radio resource blocks to a total number of radio resource blocks of the base station, a difference between a maximum number of schedulable terminals and a number of terminals scheduled in the base station, and a difference between a maximum channel bandwidth usable by the base station and a channel bandwidth used by the base station.

* * * * *